April 21, 1936.  C. P. WALKER  2,038,252
VALVE OPERATING MEANS
Filed May 31, 1935  4 Sheets-Sheet 1

Inventor
Cranford P. Walker
By Lyon & Lyon
Attorneys

April 21, 1936.  C. P. WALKER  2,038,252
VALVE OPERATING MEANS
Filed May 31, 1935  4 Sheets-Sheet 4

Inventor
Cranford P. Walker
By Lyon & Lyon
Attorneys

Patented Apr. 21, 1936

2,038,252

UNITED STATES PATENT OFFICE 2,038,252

VALVE OPERATING MEANS

Cranford P. Walker, San Marino, Calif., assignor to Consolidated Steel Corporation, Los Angeles, Calif., a corporation of California Application May 31, 1935, Serial No. 24,314

1 Claim. (Cl. 137—139)

My invention relates to a valve operating means and has particular reference to operating mechanism for controlling the position of valves, and for maintaining said valves in any desired position to which they are moved.

Considerable difficulty has been encountered in the control of hydraulically operated valves in large pipe lines, due to the necessity of providing valves of relatively large sizes, which must be accurately controlled to position the valves at any desired degree of opening, and, further, due to the tremendous hydraulic forces upon the valves by the flow of fluid through the line, the power which is required to move the valves between their open and closed positions must be relatively great. Further, it has been substantially impossible to insure that the valve, once opened to a predetermined position, will not be moved from that position by the forces of the water or other fluids flowing past the valve.

It is, therefore, an object of my invention to provide a control for a large hydraulic valve wherein the valve may be positively moved by power means to any desired position.

Another object of the invention is to provide operating mechanism for a relatively large sized hydraulic valve wherein the valve, when moved to a desired position, will be maintained in such position irrespective of the forces exerted thereon by the fluid under its control.

Another object of the invention is to provide control and operating means for large hydraulic valves wherein an operator may pre-select the position to which the valve is to be moved, and in which the valve will subsequently be moved to the predetermined position and automatically stopped thereat.

Another object of the invention is to provide a control valve of the character described in the preceding paragraph, wherein the valve, once moved to the desired position, will be automatically brought back to said position in the event it should be inadvertently moved from the desired position.

Another object of the invention is to provide a control device for large hydraulic valves, wherein the valve is operated by hydraulic power means, and in which the valve may be operated at relatively high speeds during all portions of the movement thereof, except the final closing movement, which will be accomplished at a reduced speed to avoid injury to the valve or piping connected thereto due to stopping the moving mass of water flowing through it too suddenly.

Other objects and advantages will be apparent from a study of the following specifications, read in connection with the accompanying drawings, wherein Figure 1 is a vertical elevational view of a valve and control apparatus constructed in accordance with my invention;

Fig. 7 is a detail diagrammatic view, illustrating the operation of the hydraulic control valve and mechanism employed in the practice of my invention.

Figure 1:
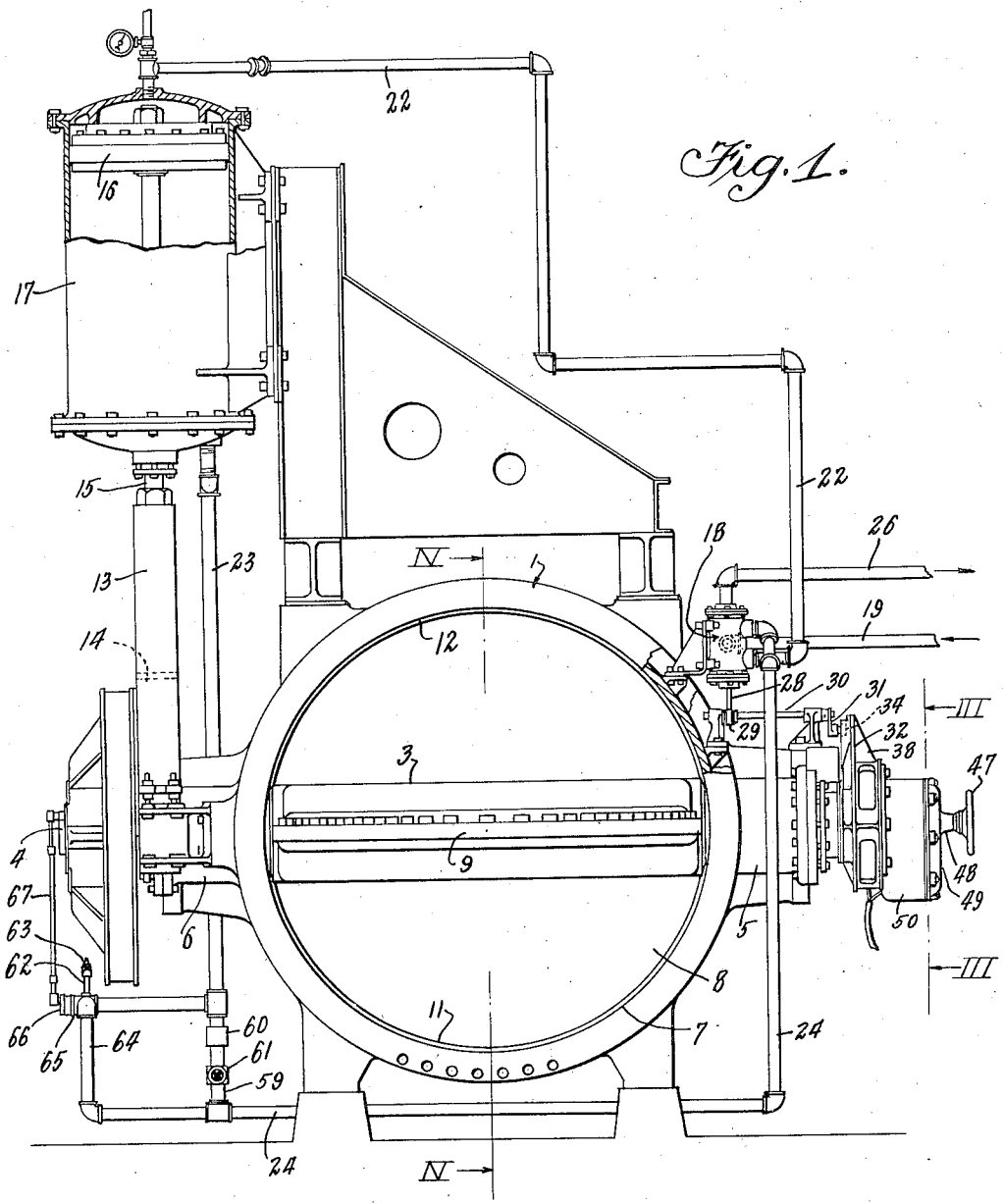
Figure 2:
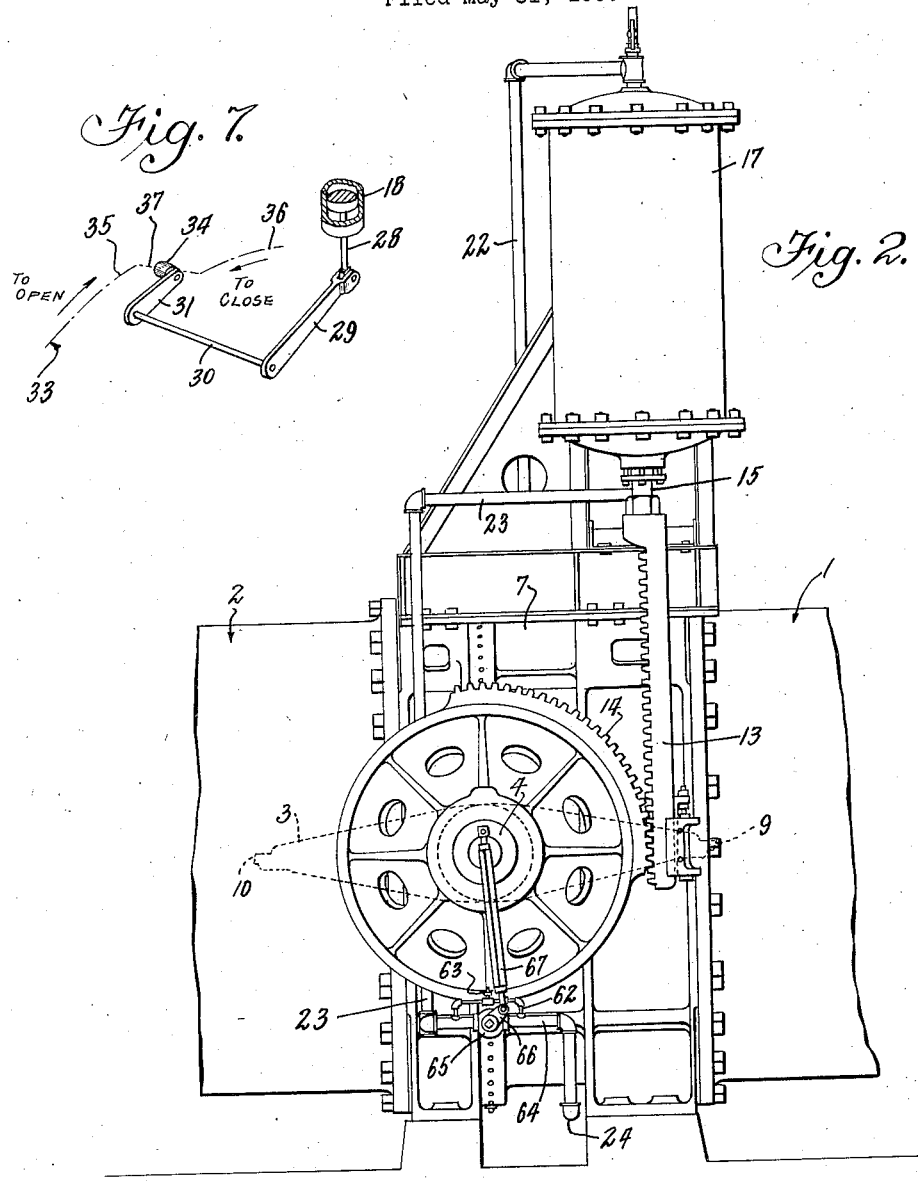
Fig. 2 is a side elevational view of the valve and control apparatus shown in Fig. 1.

Referring to the drawings, I have illustrated in Figs. 1 and 2 a hydraulic valve adapted to be interposed in a pipe line represented by the pipe sections 1 and 2.

The particular embodiment of the valve illustrated herein shows the valve constructed as a butterfly valve having a movable member 3 mounted upon a shaft 4 which is in turn journaled in suitable bearings 5 and 6 in a valve housing 7 so that the butterfly valve 3 may be moved from a closed position, wherein the valve opens the water passage 8 to a full open position, as illustrated in full lines in Fig. 1, or may be moved to an intermediate position to control the flow of fluid through the pipe line 1 and 2.

The butterfly valve 3 may be constructed in any suitable manner, as will be well understood by those skilled in this art, and provided with sealing members 9 and 10 adapted to seat upon suitable seals 11 and 12, respectively, set into the housing 7. I have illustrated the seals 9—11 and 10—12 as having angular surfaces presented toward each other in the direction of closing movement of the butterfly valve 3, and if desired, suitable adjusting devices may be provided upon these sealing members to permit them to be adjusted relative to each other as will be understood by those skilled in this art.

The butterfly valve 3 is illustrated as being adapted for power operation by means of a gear rack 13 engaging a suitable sector gear 14 rigidly secured to the shaft 4, the gear rack 13 being connected to the lower end of a piston rod 15 extending from a piston 16 reciprocating in a hydraulic cylinder 17 so that fluid, such as oil, entering the cylinder 17 below the piston 16 will cause the piston 16 to rise and thus rotate the butterfly valve 3 toward its open position, while in like manner fluid introduced above the piston will cause the piston to descend, rotating the butterfly valve 3 in the opposite direction toward its closing position.

It it will be apparent that if the valve is desired to be moved to any intermediate position between its open and closed positions by introducing a suitable quantity of fluid above the piston and permitting a suitable quantity of fluid to drain out below the piston, the valve may be closed to any desired location, while the reverse operation may be employed for the purpose of opening the valve to any desired position. The control of the movements of the piston 16 may, therefore, be readily controlled by controlling the flow of the power fluid to the cylinder 17. For this purpose I have illustrated a 4-way control valve 18 interposed in the pipe lines leading to the cylinder 17. By referring particularly to Figs. 1 and 6, it will be observed that the pipe system includes a feed pipe 19 extending from any suitable source of fluid supply which is under pressure, the feed pipe 19 connecting to one of the ports 20 in the 4-way valve 18, another of the ports 21 being connected by means of a pipe 22 to the top of the power cylinder 17. The return line from the lower end of cylinder 17 may extend through pipes 23 and 24 to another port 25 in the 4-way valve 18, while the exhaust line 26 is connected to the 4-way port 27 in the 4-way valve 18. The 4-way valve employed may be of any suitable construction so long as it is provided with a control member which can be moved from a "neutral" position, (preventing passage of fluid therethrough), to one operating position, (permitting fluid to pass from the feed pipe 19 to the pipe 22 and permitting fluid to pass from return pipe 24 to exhaust pipe 26), and movable to a third position, (allowing the fluid to pass from the feed pipe 19 to the return pipe 24 while at the same time permitting fluid to pass from pipe 22 to the exhaust pipe 26). The particular type of control valve 18 illustrated herein is of the piston type the operating rod 28 of which is illustrated as being connected to a crank 29 rigidly secured to a shaft 30 which is in turn provided with a second crank 31 which latter may be raised or lowered to raise or lower the operating rod 28 of the valve to thus change the fluid flow through the valve from the neutral position to either of the other two positions described.

As illustrated in Fig. 7, it will be apparent to those skilled in the art that by raising the lever 31 the control valve 18 will be set to supply fluid through pipes 23 and 24 to the underneath side of the piston 16, while at the same time connecting the top of the cylinder 17 with the exhaust pipe 26 and thus allowing the piston to rise and open the butterfly valve 3, while lowering of the lever 31 will supply fluid through pipes 22 to the top of the cylinder and allow the fluid in the bottom of the cylinder to exhaust through pipes 23 and 24 to exhaust pipe 26. With this arrangement the operation of the control valve 18 may be readily accomplished by means of a control cam 32 having a cam groove 33 thereon engaged with a roller 34 secured to the outer end of the crank 31, the cam groove having a high level 35 and a low level 36 for respectively raising or lowering the lever 31 when the cam is moved relative to the lever 31.

Figure 3:
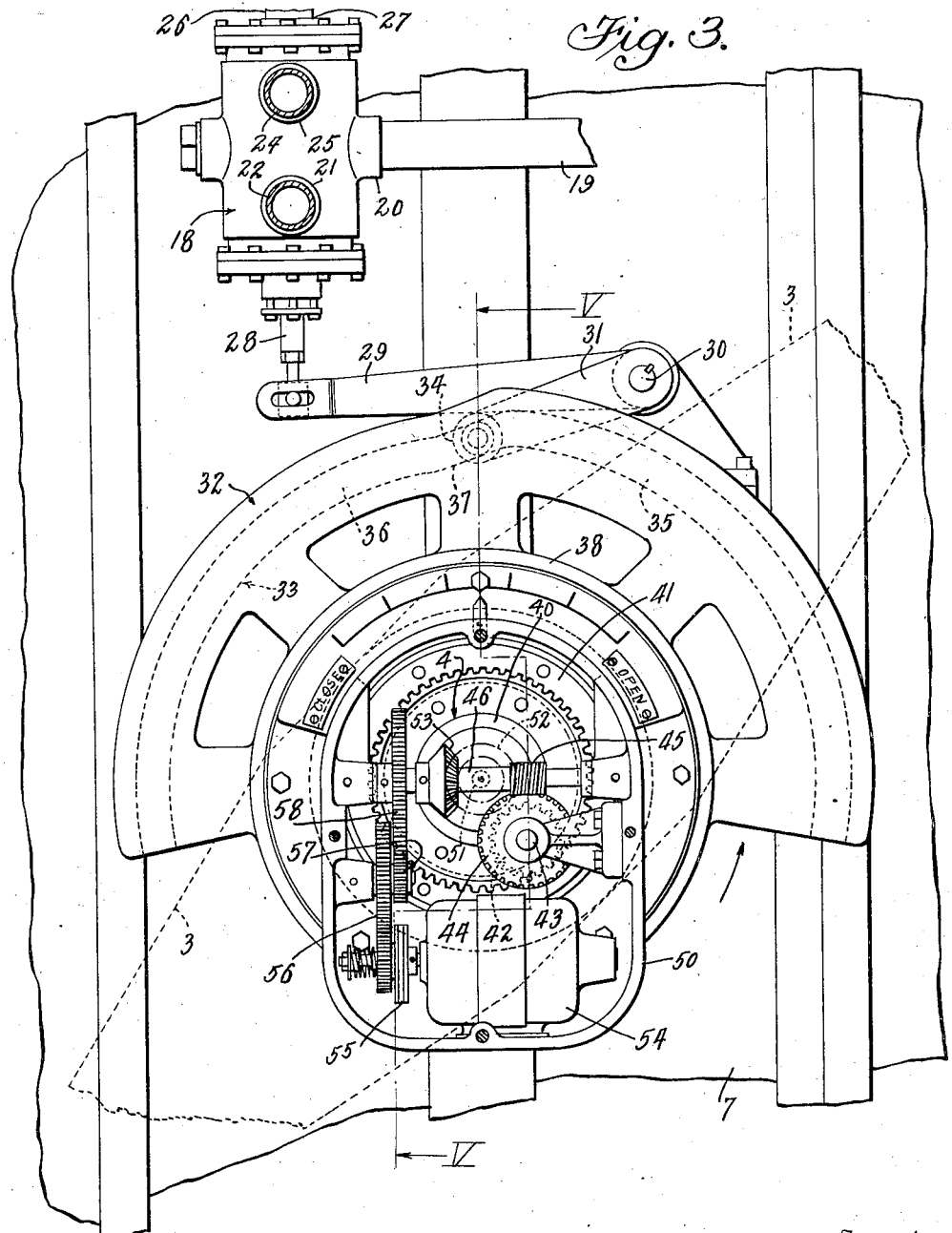
Fig. 3 is a detail, side elevational view of the control cam and control valve employed in the practice of my invention.
Figure 4:
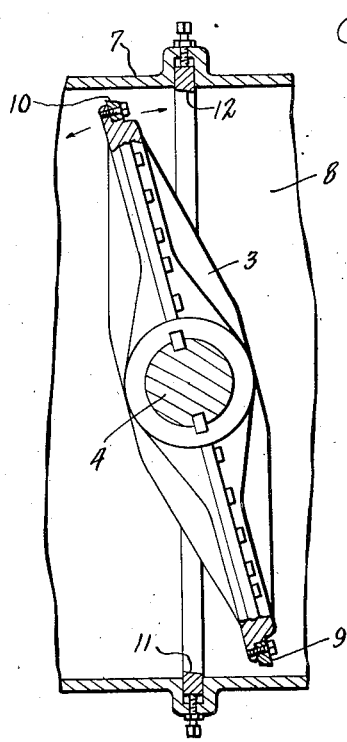
Fig. 4 is a detail, vertical sectional view, taken along lines IV—IV of Fig. 1, illustrating the seating and sealing mechanism employed with my valve.
Figure 5:
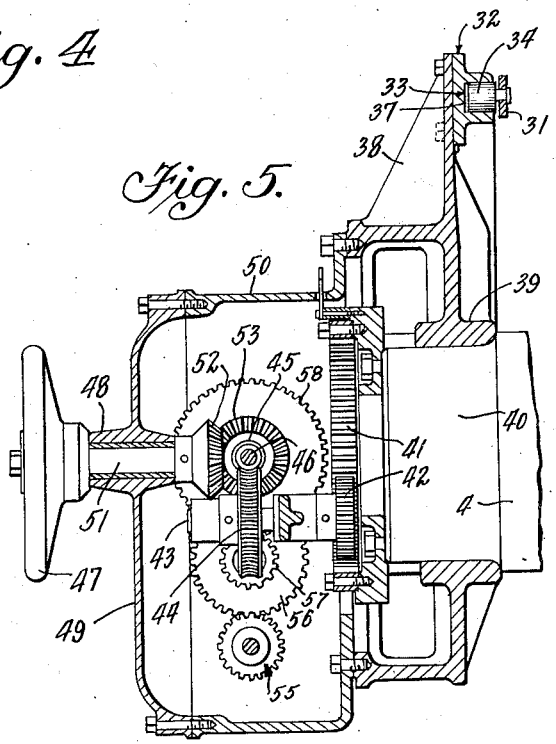
Fig. 5 is a detail, sectional view, taken along line V—V of Fig. 3.

It will be noted from an inspection of Figs. 3 and 7 that the cam groove 33 has a connecting portion 37 thereon interconnecting the high and low levels of the cam groove, this portion representing the "neutral point" on the cam groove; the roller 34 being engaged therein will maintain the lever 31 in its mid position or neutral position, preventing ingress of fluid to either the top or the bottom of the power cylinder 17.

The cam 32 is illustrated as being secured upon a spider 38 which is provided with a bearing member 39 rotatably mounted upon a reduced end section 40 of the butterfly valve shaft 4 so that by rotating the spider cam 32 about the shaft 4 away from the neutral position shown in Fig. 3, the control valve 18 will be moved upwardly or downwardly to start the butterfly valve to open or close.

To determine the position of the cam 32 relative to the shaft 4, I prefer to provide mechanism which will permit the rotation of the cam 32 relative to the shaft 4 through any number of degrees through which the operator desires the butterfly valve to move, and then fix the cam to the shaft 4 so that as the butterfly valve is moved through the selected number of degrees the cam will be carried by the movement of the shaft 4 back to its neutral position relative to the roller 34. In order to accomplish this, I provide an internal gear 41 fixed to the end of the shaft 4, which gear is meshed with a pinion 42 carried by a shaft 43 and having a worm wheel 44 thereon. The wormwheel is illustrated as being meshed with a worm 45 mounted upon a shaft 46 so that by rotation of the shaft 46 the cam will be rotated relative to the shaft 4, but as soon as rotation of the shaft 46 is stopped the cam is fixed against further movement relative to the shaft 4 until the shaft 46 again is rotated. Any means may be employed for operating the cam-actuating shaft 46, such as a handwheel 47 mounted in a bearing member 48, formed upon a cover 49 employed as a cover for the housing 50 which encloses the gears 42—44—45, the handwheel 47 being mounted upon a shaft 51 bearing at its inner end a bevel gear 52 meshing with a similar bevel gear 53 on the shaft 46 so that by rotation of the handwheel 47 the cam 32 may move relative to the butterfly valve shaft 4.

I also prefer to employ a motor drive for the shaft 46, which may be readily provided by employing a motor 54 mounted upon the housing 50 and driving the shaft through a friction clutch 55 and gears 56, 57 and 58 so that by operating the motor 54 in one direction the cam 32 will be rotated in one direction relative to the shaft 4, while operation of the motor in the reverse direction will reversely rotate the cam 32.

With the construction thus far described, it will be apparent that with the valve in the open position, as shown in Figs. 1 and 2, and with the cam 32 in the neutral position, as shown in Fig. 3, the operator may close the butterfly valve 3 by rotating the cam 32 in a clockwise direction. With the butterfly valve 3 in the full open position it will be necessary to rotate the same through 90° in order to completely close the butterfly valve 3. Hence it will be necessary to rotate the cam 32 approximately 90° from its neutral position, as shown in Fig. 3. This may be accomplished either by moving the handwheel 47 manually or by operating the control motor 54 in the desired direction.

As the cam 32 starts to move from its neutral position, as shown in Fig. 3, the cam roller 34 will ride into the low level 36 of the cam and the rod 28 will be lowered to operate the control valve 18 to supply fluid to the top of the cylinder 17 and allow fluid to pass out of the bottom of the cylinder 17. When the cam 32 has arrived in its 90° position it will remain fixed relative to the butterfly valve shaft 4, and will be moved by the shaft 4 in the direction of the arrow shown in Fig. 3, as the butterfly valve 3 moves towards its closed position. Thus the movement of the butterfly valve 3 with its shaft 4 through the 90° necessary to close the valve 3, will bring the neutral point 37 of the cam back to the neutral position shown in Fig. 3, the repositioning of the control valve 18 in its neutral position stopping further flow of fluid to the cylinder 17 at that time.

It will therefore be observed that the control for the butterfly valve 3 includes the operation of the cam 32 through the number of degrees of movement desired for the butterfly valve 3, when such movement is given to the cam, the corresponding movement of the butterfly valve 3 returns the cam always to its neutral position when the butterfly valve has moved through the same number of degrees. With my control system it will be apparent that the cam 32 may be moved through any distance from its neutral position representative of the degree or amount of movement through which the valve member 3 is desired to be moved. For example, if it is desired to only partially close the valve, say through 60° instead of the full 90° necessary to completely close the same, the rotation of the cam 32 may be stopped after it has been moved through 60° and the butterfly valve will move through 60° to bring the neutral point 37 of the cam back to the vertical position as shown in Fig. 3, thus stopping the valve in this desired position.

To open the butterfly valve 3, the reverse operation is necessary, the cam 32 being moved in a counter-clockwise direction through the desired number of degrees and when the butterfly valve moves through the same number of degrees in the direction opposite to the arrow on Fig. 3, the neutral point of the cam will again be brought to the vertical position to close the control valve 18.

With the construction thus far described, it will be apparent that the butterfly valve 3 may be accurately controlled through any of its desired positions from a point remote from the valve 3 by employing a suitable indicator at the remote control point to show the position to which the valve has been moved. By the employment of the mechanism hereinbefore set forth, the same control mechanism which is employed to move the butterfly valve 3 may be employed for insuring that the butterfly valve 3 shall remain in the position to which it is moved.

For example, assuming that the butterfly valve is desired to be held in its mid position, that is 45° from its full closed position, the cam 32 may be moved to the 45° position and when the butterfly valve 3 arrives in this position the neutral point of the cam 32 will be in the vertical position, as shown in Fig. 3. Then should the water pressure or any other cause move the butterfly valve away from the 45° position, such movement of the butterfly valve will be accompanied by an equal movement of the cam 32 which will move the neutral position portion 37 away from the vertical position, as shown in Fig. 3. When the valve is open the flow of water therethrough tends to move the butterfly valve 3 toward its closed position and if these forces do cause a movement of the valve 3 toward its closed position, the cam 32 will be carried by the shaft 4 in a counterclockwise direction, thus moving the roller 34 into the high level of the cam, operating the control valve 18 to its position necessary to open the butterfly valve 3. As soon, however, as the resulting reopening movement of the butterfly valve 3 is sufficient to restore the cam 32 to its neutral position, (that is, when the butterfly valve has been moved back to its original position), the valve 18 will be again be placed in its neutral position to stop further movement of the valve 3.

Thus any creepage of the butterfly valve 3 is automatically corrected without the necessity of the attendant watching and correcting the same. This correction will occur at any point throughout the entire movement of the butterfly valve 3 for which the cam 32 may be positioned by the handwheel 47 or by the motor 54.

When the valve 3 is of considerable diameter, the flow of a large mass of water through the valve requires that the valve 3 be moved to its closed position at a relatively slow speed in order to prevent a dangerous rise of pressure upon the upstream side of the valve, and a dangerous vacuum on the downstream side of the valve. Thus while it is permissible to move the valve 3 toward its closing position at a relatively high speed, the last portions of the closing movement must be considerably retarded to avoid this hydraulic hammer effect. For this purpose I have illustrated particularly, in Fig. 6, a flow system which, though it will permit the valve 3 to be moved at a relatively high speed through any of its movements to open position, will positively reduce the speed of movement of the valve 3 as it approaches its closed position. This is accomplished by providing the return line 23 with a plurality of passages communicating with the return pipe 24, one of such passages being illustrated as including a pipe 59 in which is interposed a check-valve 60 and a regulating valve 61, while a second passage is illustrated as a small pipe 62 having a regulating valve 63 therein and a third passage is illustrated as including a pipe 64 having a cut-off valve 65 interposed therein.

Figure 6:
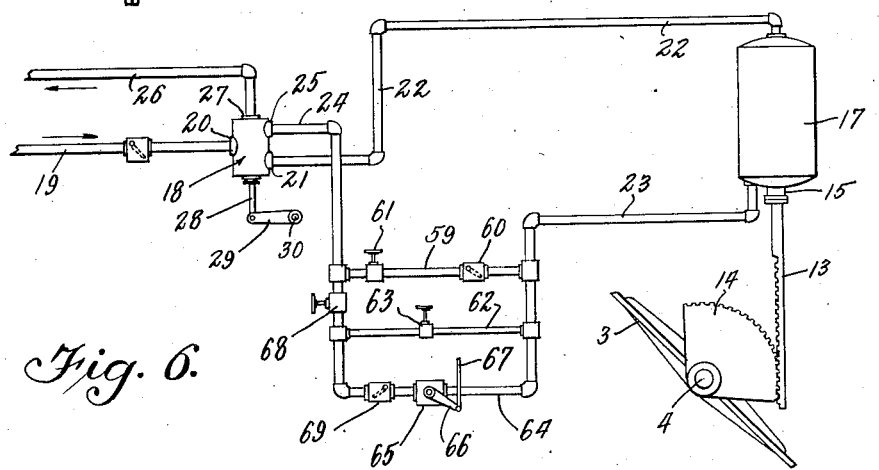
Fig. 6 is a detail view of the hydraulic operating and control apparatus employed in the practice of my invention.

By referring particularly to Fig. 6, it will be observed that when the control valve 18 is set to close the butterfly valve 3, the fluid flowing from the bottom of the cylinder 17 will pass through pipe 23 but will not pass through the pipe 59, due to the check-valve 60. Thus the return fluid must flow through pipes 62 and 64. The cut-off valve 65 is illustrated as being controlled by the position of the valve 3 by connecting the operating lever 66 thereof through a link 67 mounted eccentrically upon the shaft 4 in such position that when the valve 3 has been moved to about 10° away from its closed position, the operating arm 66 of the cut-off valve 65 will be moved to closed position. Thus while the flow of fluid through the return pipe 23 is substantially unrestricted during al portions of the closing movement up to the 10° position, the closing of the valve 65 in this position will require that the return fluid shall pass through the small bypass pipe 62, this bypass acting as a check to positively reduce the speed of movement of the valve 3. By adjusting the regulating valve 63 in the bypass 62 to any desired value, the speed of the final closing movement of the valve 3 may be carefully regulated. Also, it will be observed that an additional regulating valve 68 may be provided between the bypass 62 and the pipe 59 to regulate the remaining portions of the closing movement of the valve 3.

It will be observed, on the other hand, that when it is desired to move the butterfly valve 3 from its closed position, the flow of fluid through the pipe 24 into the bottom of the cylinder 17 will be restricted only by the regulating valve 61 which may be set in any desired position to permit a desired flow through the pipe 59, the pipe 64 having a check valve 69 interposed therein to prevent any operation of the cut-off valve 65 from affecting the operation of the butterfly valve during its opening movement.

While in the embodiment shown herein the valve 3 is illustrated as a butterfly valve, it will be apparent that my control device may be readily adapted to gate valves, or valves of any other construction where the power means for operating the valve is not inherently self-locking, and that when it is desired to move such valves to any desired position, all that is necessary is to move the control cam 32 to the desired position and the valve will be positively and automatically caused to move to the selected position and then remain in this position in spite of any cause which might tend to alter the position of the valve so controlled.

While I have shown and described the preferred embodiment of my invention, it is to be understood that I do not wish to be limited to any of the details of construction shown herein, except as defined in the appended claim.

I claim:

In a valve construction, a valve having a member movable between a closed position and an open position, hydraulic power means for moving said valve toward either of said positions, a control valve for said hydraulic power means movable from a neutral position to one position to open said valve member and to another position for closing said valve member, means for actuating said control valve including a cam having a high level for moving said control valve to one of its positions and a low level for moving said control valve to another of its positions, and having a connecting level between said high and low levels for holding said control valve in its neutral position, means mounting said cam for movement relative to said valve member in either of two directions, means for fixing said cam relative to said valve member when it has been moved, whereby movement of said cam in either direction will cause said valve member to be moved toward either of its positions respectively and movement of said valve member will return said cam to said neutral position.

CRANFORD P. WALKER.